United States Patent Office 3,318,935
Patented May 9, 1967

---

3,318,935
ORGANOSILICON MATERIAL
Christian R. Sporck, Burnt Hills, N.Y., assignor to General Electric Company, a corporation of New York
No Drawing. Filed Dec. 18, 1961, Ser. No. 160,262
3 Claims. (Cl. 260—448.2)

This invention relates to cyclic organosilicon materials and to polymers prepared therefrom.

A number of cyclic organosilicon materials and polymers prepared therefrom are known in the art, including materials which contain a high proportion of silicon-bonded phenyl groups. The presence of a large proportion of silicon-bonded phenyl groups in organosilicon polymers is desired because of the properties imparted to the organosilicon polymers by the phenyl groups. For example, the phenyl groups improve the resistance of the polymers to irradiation such as pile irradiation or high energy electron irradiation and the phenyl groups improve the thermal stability, particularly in oxidizing atmospheres, of organosilicon polymers.

Despite the desire for organosilicon polymers of high phenyl content, there have been certain problems in the preparation of such materials. For example, organosilicon polymers in which all of the organo groups are phenyl groups are hard, intractable materials which are difficult to work mechanically and form into desired shapes. When attempts are made to copolymerize two different materials, one of which contains all silicon-bonded phenyl groups and one of which contains other than silicon-bonded phenyl groups, the resulting material has usually contained very large blocks of silicon atoms in which all of the organo substituents are phenyl groups and other large blocks in which none of the substituents are phenyl groups. This is caused by the different reactivities of the starting materials available to form such materials.

The present invention is based on my discovery of a specific class of cyclic organosilicon compounds which can be polymerized or copolymerized to form high molecular weight organosilicon compounds of predetermined and uniform structure which contain a high percentage of silicon-bonded phenyl groups but which exhibit none of the disadvantages of prior art matetrials containing all silicon-bonded phenyl groups or blocks of silicon-bonded phenyl materials and blocks of silicon atoms containing other than phenyl groups.

The cyclic organosilicon compounds of the present invention have the formula:

(1)

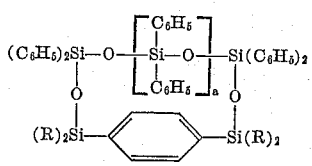

where $a$ is a whole number equal to from 0 to 1, inclusive, and R is a monovalent hydrocarbon radical. The cyclic organosilicon compounds of Formula 1 can be polymerized to form linear organosilicon compounds consisting essentially of the recurring units:

(2)

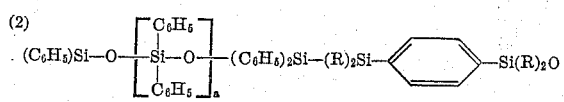

where $a$ and R are as previously defined. In addition, the cyclic organosilicon compounds of Formula 1 can be copolymerized with other organosilicon compounds, such as various cyclic polydiorganosilixanes, to form a number of copolymers.

The cyclic organosilicon compounds of Formula 1 can be prepared by effecting reaction between a bis-(diorganohydroxysilyl)benzene having the formula:

(3)

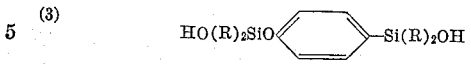

where R is as previously defined and a chlorine chain-stopped polydiphenylsiloxane having the formula:

(4)        $Cl(C_6H_5)_2Si-O-[(C_6H_5)_2SiO]_a-Si(C_6H_5)_2Cl$ where $a$ is as previously defined.

The bis-(diorganohydroxysilyl)benzenes within the scope of Formula 3 are well known in the art and described, for example, in Patent 2,561,429—Sveda. Among the monovalent organic radicals represented by R in Formulae 1, 3 and 5 can be mentioned, for example, alkyl radicals, e.g., methyl, ethyl, butyl, octyl, etc. radicals; aryl radicals, e.g., phenyl, naphthyl, xylyl, tolyl, etc. radicals; aralkyl radicals, e.g., benzyl, phenylethyl, etc. radicals; unsaturated monovalent hydrocarbon radicals, e.g., vinyl, allyl, etc. radicals. The preferred radicals represented by R of Formula 3 are methyl and phenyl radicals, with methyl radicals being the preferred specific radical. Thus, the preferred compound within the scope of Formula 3 is p-bis-(dimethylhydroxysilyl)benzene. While the compounds of Formula 3 are shown with the two silicon atoms in the para positions of the benzene nucleus, it should be understood that in modifications of the present invention, the two silicon substituents may be present in the ortho or meta positions. However, the para-substituted benzene is preferred. While Formula 3 shows no substituents on the benzene nucleus other than the two silicon atoms, it should be understood that other substituents may be present, such as various organic radicals, preferably monovalent hydrocarbon radicals, such as methyl groups or phenyl groups.

The preparation of the bis-(diorganohydroxysilyl)benzenes within the scope of Formula 3 is described in the aforementioned Sveda patent and is effected by conducting a conventional Grignard coupling reaction between a diorganodichlorosilane having the formula:

(5)        $R_2SiCl_2$ and a dichloro-substituted benzene having the formula:

(6)

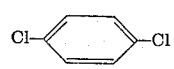

in the presence of magnesium and a suitable solvent as taught in the aforementioned Sveda patent.

The chlorine-stopped polydiphenylsiloxanes within the scope of Formula 4 are also well known in the art and include 1,3-dichloro-1,1,3,3-tetraphenyldisiloxane and 1,5-dichloro-1,1,3,3,5,5-hexaphenyltrisiloxane. It is apparent that when the reaction involves 1,3-dichloro-1,1,3,3-tetraphenyldisiloxane and a compound within the scope of Formula 3, the resulting cyclic organosilicon compound within the scope of Formula 1 contains two intercondensed diphenylsiloxane units, i.e., the subscript $a$ is equal to 0. When the starting material within the scope of Formula 4 is 1,5 - dichloro - 1,1,3,3,5,5 - hexaphenyltrisiloxane, the product resulting from the reaction with the compound of Formula 3 is the cyclic organosilicon compound within the scope of Formula 1 having three intercondensed diphenylsiloxane units, i.e., the subscript $a$ is equal to 1.

The reaction to form the cyclic organosilicon compounds within the scope of Formula 1 theoretically involves one mole of the chlorine chain-stopped polydiphenylsiloxane of Formula 4 and one mole of the bis-(diorganohydroxysilyl)benzene of Formula 3 and results in the formation of two moles of hydrogen halide. To facilitate the reaction, a hydrogen halide acceptor is employed. Suitable hydrogen halide acceptors are any organic tertiary amine, e.g., pyridine, triethyl amine, N,N-dimethyl aniline, etc. In theory, one mole of the hydrogen halide acceptor is required for each mole of hydrogen halide generated. While the theoretical ratio of reactants has been described above, the ratio of these ingredients can vary within wide limits. For example, the chlorine chain-stopped polydiphenylsiloxane of Formula 4 can be employed in an amount equal to from about 0.5 to 2 moles per mole of the substituted benzene of Formula 3. Preferably, the hydrogen halide acceptor is employed in excess with there being from about 3 to 30 moles of the hydrogen halide acceptor per mole of whichever of the other two reactants is present in the smaller amount. Preferably, the chlorine chain-stopped material of Formula 4 and the substituted benzene of Formula 3 are employed in equimolar amounts to reduce the formation of by-products. The use of equimolar amounts also simplifies the purification of the desired cyclopolysiloxane since no significant amount of unreacted starting materials are left in the reaction mixture.

Because the chlorine chain-stopped polydiphenylsiloxane of Formula 4, the substituted benzene of Formula 3 and the cyclic organosilicon compounds within the scope of Formula 1 are solid materials at room temperature, it is preferable to effect the reaction in the presence of a solvent which is inert to the reactants under the conditions of the reaction and which is a solvent for all reactants and reaction products except the hydrohalide of the hydrogen halide acceptor. Suitable solvents include tetrahydrofuran, tetrahydropyran, n-hexane, xylene, diethyl ether and toluene. In general, the solvent is employed in the ratio of from about 1 to 50 parts by weight, based on the total weight of the other components of the reaction mixture.

Because the reaction to prepare the cyclic organosilicon compounds within the scope of Formula 1 proceeds at a satisfactory rate at room temperature, it is preferred to conduct the reaction at such temperature, i.e., a temperature of from about 15 to 25° C. However, it should be understood that the use of elevated temperatures, e.g., temperatures of from about 25 to 120° C. is not precluded. Depending upon the proportions of ingredients, the reaction temperature and the particular solvent employed, the time required for effecting reaction between the chlorine chain-stopped polydiphenylsiloxane of Formula 4 and the substituted benzene of Formula 3 can vary from about 1 hour to 24 hours or more.

After the reaction is completed, the reaction mixture consists of a solution of the cyclic organosilicon compound within the scope of Formula 1 together with any unreacted starting materials and a hydrohalide precipitate. This precipitate is filtered from the reaction mixture and the ersulting filtrate is stripped of solvent and any volatile materials, resulting in a crude product. The crude product is recrystallized from a suitable solvent such as benzene, hexane, ethanol, n-butanol, cyclohexane, or mixtures thereof to produce the purified cyclic organosilicon compound of Formula 1.

Polymeric materials consisting essentially of the recurring unit of Formula 2 can be formed by the polymerization of the cyclic organosilicon compounds of Formula 1 by several methods. For example, the material of Formula 1 can be polymerized by heat alone, by maintaining the material of Formula 1 at a temperature of from about 300 to 400° C., preferably in an inert atmosphere such as nitrogen or a noble gas, for about 15 minutes to one hour, during which time one of the siloxane bonds of the cyclic material opens up and permits a conventional rearrangement and condensation to form a polymeric material which is a hard thermoplastic polymer at room temperature and viscous moldable gum at temperatures in excess of 50° C. This polymer is soluble in benzene and toluene. This polymer can contain from about 15 to 8,000 or more and preferably from about 150 to 8,000 or more of the recurring structural units of Formula 2, depending upon the reaction temperature and time. In general, these polymers have an intrinsic viscosity of the order of about 0.25 to 4.0 deciliters per gram when measured in toluene at 30° C. and have a molecular weight of the order of from about 10,000 to 5,000,000 or more.

Another and preferred method of forming the polymers of the present invention is by the catalytic rearrangement and condensation of the cyclic organosilicon compounds of Formula 1. This rearrangement and condensation is effected in the presence of a typical alkaline organopolysiloxane rearrangement and condensation catalyst such as potassium hydroxide. In order to insure thorough mixing of the rearrangement and condensation catalyst with the cyclic organosilicon compounds of Formula 1 and to permit the rearrangement and condensation at a relatively low temperature, the rearrangement and condensation reaction is effected in the presence of a solvent which is inert to the reactants under the conditions of the reaction. Suitable solvents are any of the conventional aromatic solvents such as, for example, toluene, xylene, mesitylene, phenylcyclohexane, diphenyl ether, etc. In general, the amount of solvent employed is kept as low as possible with only sufficient solvent being employed to provide a substantially saturated solution of the cyclic organosilicon compound of Formula 1. In general, these saturated solutions contain from about 0.5 to 1 part by weight solvent per part of the cyclic organosilicon compound.

The rearrangement and condensation catalyst is conventionally added to the cylic organosilicon compound as a solution in octamethylcyclotetrasiloxane, for example, as a solution containing from about 0.01 to 1% by weight of potassium hydroxide. In general, the amount of potassium hydroxide added is sufficient to provide from about 10 to 1000 parts by weight potassium hydroxide per million parts by weight of the cyclic organosilicon compounds of Formula 1. The catalytic polymerization is effected by heating the catalyzed solution at a temperature on the order of from about 110 to 170° C. with polymerization being completed in a time which can vary from a few seconds up to one hour or more. After the polymerization is completed, the solvent is stripped from the reaction mixture, resulting in a polymer identical to the polymer prepared by the thermal polymerization previously described.

In addition to forming polymers of the cyclic organosilicon compounds of Formula 1 alone, copolymers can be prepared by reacting these materials with cyclic polydiorganosiloxanes. Preferably, in preparing these copolymers, the base catalyzed rearrangement and condensation reaction in solution described above is employed.

Suitable cyclic polydiorganosiloxanes for copolymerization with the cyclic organosilicon compounds of Formula 1 include, for example, hexaphenylcyclotrisiloxane, octaphenylcyclotetrasiloxane or octamethylcyclotetrasiloxane; 1,1-dimethyl-3,3,5,5-tetraphenylcyclotrisiloxane which is described and claimed in my copending application Serial No. 160,264, now abandoned; 1,1-dimethyl-3-3,5,5,7,7-hexaphenylcyclotetrasiloxane which is described and claimed in the copending application of Howard A. Vaughn, Jr., Serial No. 160,267, now abandoned; triphenylsiloxy pentaphenylcyclotrisiloxane or triphenylsiloxy heptaphenylcyclotetrasiloxane which are described and claimed in my copending application Serial No. 160,263; 1,1-bis-(p-chlorophenyl)-3,3,5,5-tetraphenylcyclotrisiloxane of p-chlorophenylheptaphenylcyclotetrasiloxane which are described and claimed in my copending application Serial No. 160,265; methylphentaphenylcyclotrisiloxane or methylheptaphenylcyclotetrasiloxane which are described and claimed in my copending application Serial No. 160,270; 1-methyl-1-(beta-cyanoethyl)-3,3,5,5-tetraphenylcyclotrisiloxane or gamma-cyanopropylheptaphenylcyclotetrasiloxane which are described and claimed in my copending application Serial No. 160,271; compounds such as 1,1-bis-(trifluoromethylphenyl)-3,3,5,5-tetraphenylcyclotrisiloxane which are described and claimed in my copending application Serial No. 160,272; vinylpentaphenylcyclotrisiloxane or vinylheptaphenylcyclotetrasiloxane which are described and claimed in my copending application Serial No. 160,268; and 1-methyl-1-vinyl-3,3,5,5-tetraphenylcyclotrisiloxane or 1-methyl-1-vinyl-3,3,5,5,7,7-hexaphenylcyclotetrasiloxane which are described and claimed in my copending application Serial No. 160,269. All of the aforementioned copending applications are filed concurrently herewith and assigned to the same assignee as the present invention.

The copolymerization of the cyclic organosilicon compounds of Formula 1 with the cyclic polydiorganosiloxanes described above results in high molecular weight polysiloxanes which are soluble in solvents such as benzene and toluene. When copolymeric organopolysiloxanes are prepared as described above, the procedure employed is identical to that employed in preparing the polymers consisting of the recurring units of Formula 2. The ratio of the various cyclic organosilicon compounds used in the preparation of copolymers can vary without limit, depending upon the characteristics desired in the final copolymeric material. Satisfactory copolymers are prepared from mixtures containing from 1.0 to 99% by weight of the cyclic organosilicon compounds of Formula 1 based on the total weight of such cyclic organosilicon compounds and the other polydiorganosiloxane cyclic materials.

Because of the polymers consisting essentially of the recurring structural units of Formula 2 contain such a high aromatic content, it is not possible to cross-link these materials by conventional means such as ioniizng radiation or free-radical chemical catalysts. However, many of the copolymers prepared by the rearrangement and condensation of a mixture of a cyclic organosilicon compound of Formula 1 with other cyclic polydiorganosiloxanes can be cross-linked by conventional means. For example, copolymers containing at least one vinyl group per 100 silicon atoms or containing at least one pair of adjacent methyl-containing silicon atoms per 100 silicon atoms can be cross-linked with either ionizing radiation or by chemical means.

Because the copolymers of the present invention usually have a high phenyl content, the irradiation doses are generally higher than the doses employed in cross-linking conventional methyl silicone rubber. Such irradiation doses for cross-linking these copolymers are of the order of from about $100 \times 10^6$ to $1000 \times 10^6$ Roentgens. Preferably, this irradiation is provided by high energy electron bombardment as described and claimed in Patent 2,763,609—Lawton et al. employing electrons having energies of from about 50,000 to 20,000,000 electron volts. The cross-linking of the polymers and copolymers described above results in the formation of silicone rubber.

Where chemical cross-linking is employed, any of the conventional free-radical cross-linking agents common to the silicone industry can be used. Typical cross-linking agents are, for example, benzoyl peroxide, di-alpha-cumyl peroxide, dichlorobenzoyl peroxide, t-butyl perbenzoate, zirconyl nitrate, as well as other common organoperoxide vulcanizing agents. These cross-linking agents are added to the copolymers in an amount equal to from about 0.1 to 10% by weight, based on the weight of the copolymer and the catalyzed mixture is heated at an elevated temperature until cross-linking is effected. A suitable curing cycle involves a first cure at a temperature of about 120 to 150° C. for about 15 to 30 minutes, followed by a post-cure for 1 to 24 hours or more at a temperature of about 150 to 250° C.

The cross-linking of the copolymers described above can be effected in either the presence or absence of filler materials to produce such silicone rubber. Among the many fillers which can be employed during the cross-linking of the polymers and copolymers described above are the various silica fillers such as silica aerogel, fumed silica and precipitated silica as well as other types of fillers such as titanium dioxide, calcium silicate, ferric oxide, chromic oxide, cadmium sulfide, asbestos, glass fibers, calcium carbonate, carbon black, lithopone, talc, etc. Preferably, the filler employed in preparing the silicone rubber is a finely divided silica filler. The percentage of filler in the silicone rubber can vary within extremely wide limits. In general, however, the fillers are employed in the ratio of from about 20 to 300 parts by weight filler per 100 parts by weight of the homopolymer or copolymer.

The silicone rubber described above is useful in all of those applications where conventional silicone rubber is useful and is particularly useful in applications where resistance to irradiation is required, where flexibility at elevated temperatures is required, and where an exceptionally high degree of thermal stability is required, particularly in oxidizing atmospheres. For example, these materials are satisfactory for use as gaskets for automotive transmissions and as oven door seals and the like and as insulation for electrical conductors.

The following examples are illustrative of the practice of my invention and are not intended for purposes of limitation. All parts are by weight.

Example 1

Into a reaction vessel were placed 148 parts of 1,3-dichlorotetraphenyldisiloxane in 350 parts diethyl ether and 53 parts pyridine. To the reaction vessel was then added 74.5 parts of bis-(dimethylhydroxysilyl)benzene dissolved in 700 parts diethyl ether. The reaction mixture was then stirred at room temperature for about one hour during which time a pyridine hydrochloride precipitate formed. This precipitate was removed by filtration and diethyl ether was removed by evaporation. The resulting solid material was dissolved in toluene at a temperature of about 80° C. and allowed to cool. During the cooling of this solution to room temperature, a crystalline precipitate was formed. This precipitate was then recrystallized two times from xylene to yield a white crystalline material having the formula:

(7) 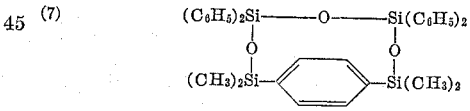

This crystalline material had a melting point of 211 to 213° C. and its identity was confirmed by infrared analysis and chemical analysis. Infrared analysis of this material showed a peak at 7.9 microns, corresponding to the methyl-silicon linkage, a peak at 8.7 microns, corresponding to the silphenylene group, peaks at 8.9 and 14 microns, corresponding to the diphenylsilyl group and a peak at 14.3 microns, corresponding to the phenyl group. Chemical analysis showed the presence of 66.7% carbon, 5.9% hydrogen and 17.7% silicon as compared with the theoretical values of 67.5% carbon, 6.0% hydrogen and 18.5% silicon.

Example 2

The cyclic organosilicon compound of Example 1 was converted to a polymer by heating a portion of the polymer at 350° C. for one hour. At the end of this time a polymer had been produced which consisted essentially of the following recurring structural units:

(8)

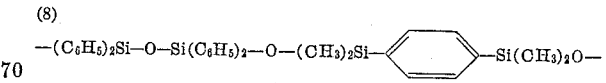

This polymer was a hard thermoplastic material at room temperature but softened to a viscous gum at a temperature of about 50° C. This gum had a molecular weight in excess of about 20,000. This polymer is used to encapsulate a transformer by placing the transformer in a container, heating the polymer to 80° C. to soften it, compressing the softened polymer into the voids between the container and the transformer, cooling the assembly to 20° C. and removing the encapsulated transformer from the container.

Example 3

A copolymer is formed by forming a solution of 54.0 parts of the cyclic material of Example 1 and 59.4 parts of 1,1,5,5 - tetramethyl-3,3,7,7-tetraphenylcyclotetrasiloxane in 30 parts dichlorobenzene at a temperature of about 165° C. To this hot solution was added 1.4 parts of a 0.4% solution of potassium hydroxide in octamethylcyclotetrasiloxane. At the end of two hours at 165° C., the cyclic material had been converted to a gum. This gum was dissolved in 100 parts toluene, 5 parts iodine was added to neutralize the potassium hydroxide and 100 parts methanol were added to precipitate the gum. This gum showed infrared bands characteristic of dimethylsiloxane units, diphenylsiloxane units and silphenylene units. No bands corresponding to the siloxane ring or silphenylene siloxane ring were present. This gum had an intrinsic viscosity of 0.41 when measured in toluene at 30° C. It had a molecular weight of about 53,000. A silicone rubber was prepared from this gum by compounding 100 parts of this gum with 40 parts of precipitated silica and irradiating the mixture with 800 kilovolt peak electrons to a dose of $100 \times 10^6$ Roentgens. The product is a tough silicone rubber which is resistant to irradiation, which remains flexible over a wide temperature range and which is resistant to thermal degradation.

Example 4

Following the general procedure of Example 1 of Patent 2,561,429–Sveda, m-bis-(diphenylhydroxysilyl)-benzene is prepared from 570 parts of m-phenyldibromide, 750 parts diphenyldichlorosilane, 75 parts metallic magnesium and 200 parts anhydrous ethyl ether. Four hundred seventy-five parts of this product dissolved in 4000 parts diethyl ether are added slowly to a reaction vessel containing 650 parts 1,5-dichloro-1,1,3,3,5,5-hexaphenyltrisiloxane in 2000 parts diethyl ether, and also containing 450 parts pyridine. After the addition is completed, the contents of the reaction vessel are agitated for two hours, during which time pyridine hydrochloride precipitates. This precipitate is filtered from the reaction mixture and the diethyl ether is removed by evaporation. The resulting solid material is dissolved in hot toluene and recrystallized therefrom and the crystals are twice more recrystallized from xylene to produce a cyclic organosilicon material having the formula:

(9)
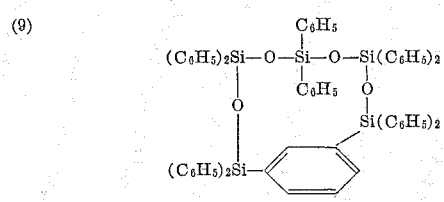

Example 5

Following the procedure of Example 2, the cyclic organosilicon material of Example 3 is converted to a linear organosilicon material containing the following recurring structural units:

(10)
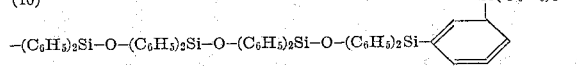

This material is used to encapsulate a transformer by the process of Example 2.

What I claim as new and desire to secure by Letters Patent of the United States is:

1. A cyclic organosilicon compound having the formula:

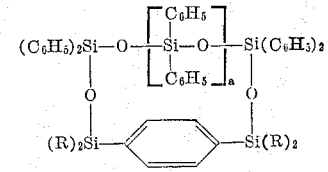

where $a$ is a whole number equal to from 0 to 1, inclusive, and R is a monovalent hydrocarbon radical.

2. A cyclic organosilicon compound having the formula:

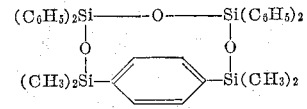

3. A cyclic organosilicon compound having the formula:

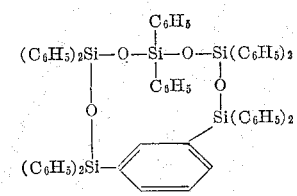

References Cited by the Examiner

UNITED STATES PATENTS

| | | | |
|---|---|---|---|
| 2,562,000 | 7/1951 | Sveda | 260—448.2 |
| 2,684,379 | 7/1954 | Guillissen et al. | 260—448.2 |
| 2,709,692 | 5/1955 | Gainer | 260—448.2 |
| 2,780,636 | 2/1957 | Wright et al. | 260—448.2 |
| 2,954,391 | 9/1960 | Riley et al. | 260—448.2 |
| 3,037,962 | 6/1962 | Hartung et al. | 260—448.2 |
| 3,053,872 | 9/1962 | Omietanski | 260—448.2 |
| 3,086,954 | 4/1963 | Polmanteer et al. | 260—448.2 |
| 3,135,777 | 6/1964 | Nielsen | 260—448.2 |

OTHER REFERENCES

Eaborn, "Organosilicon Compounds," Academic Press Inc., New York, published 1960, pp. 230–231 and 237.

TOBIAS E. LEVOW, *Primary Examiner.*

SAMUEL H. BLECH, *Examiner.*

J. G. LEVITT, P. F. SHAVER, *Assistant Examiners.*